United States Defensive Publication [19] (H) [11] T102,201

Harrison [43] Sep. 7, 1982

[54] GRANULATION OF UREA PHOSPHATE FROM UREA AND MERCHANT-GRADE PHOSPHORIC ACID

[76] Inventor: Cecil P. Harrison, Rte. 7, Florence, Ala. 35630

[21] Appl. No.: 322,096

[22] Filed: Nov. 16, 1981

[51] Int. Cl.[3] ..... C05B 15/00; C05C 9/00

[52] U.S. Cl. ..... 71/29; 71/64.06

[57] ABSTRACT

A process for direct granulation of unpurified urea phosphate from urea or urea solution and merchant or filter grade wet-process phosphoric acid to produce a product with exceptional satisfactory physical and chemical properties for direct application to the soil or for use in production of fluid fertilizers. The process involves the utilization of sweep air in both the reactor and the granulator to remove water from the heat sensitive urea phosphate mixture to cause granulation of the product. The requirement for product drying with applied heat after granulation is eliminated. The process may be used for producing urea-urea phosphate provided certain precautions are taken to minimize hydrolysis of urea to prevent the resultant ammonia which in turn will react with the acid to form monoammonium phosphate.

9 Claims, 1 Sheet Drawing,

19 Pages Specification

The file of this unexamined application may be inspected and copies thereof may be purchased (849 O.G. 1221, Apr. 9, 1968).

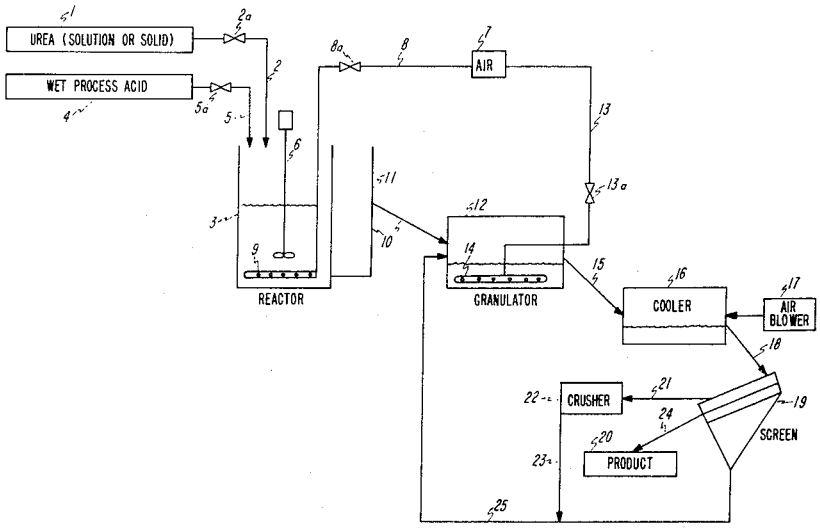

DIRECT GRANLATION OF UREA PHOSPHATE

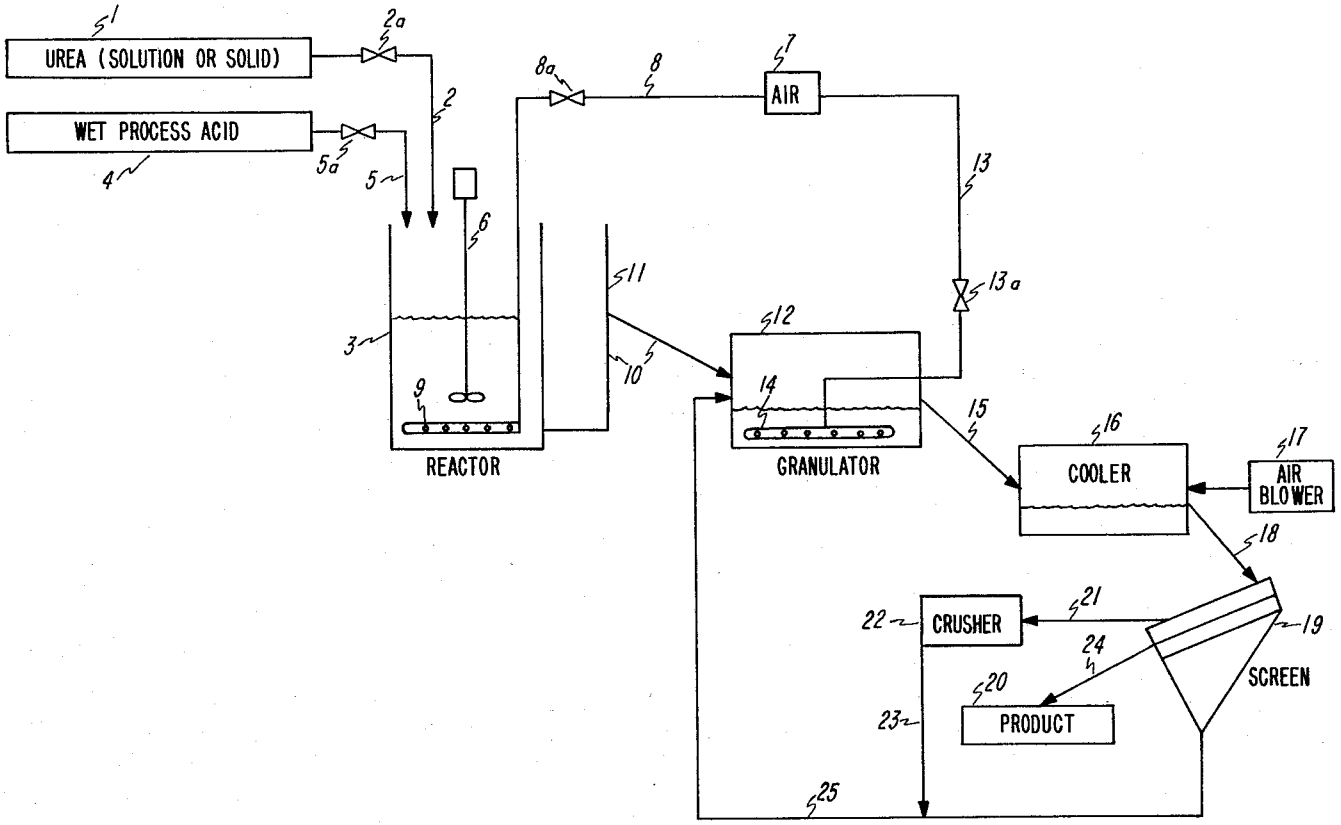
DIRECT GRANLATION OF UREA PHOSPHATE